No. 662,707. Patented Nov. 27, 1900.
H. BLACKMAN.
ELECTRICAL CONNECTOR.
Application filed June 6, 1899.

(No Model.)

WITNESSES:
Fred White
Thomas F. Wallace

INVENTOR:
Henry Blackman,
By his Attorneys,

UNITED STATES PATENT OFFICE.

HENRY BLACKMAN, OF NEW YORK, N. Y.

ELECTRICAL CONNECTOR.

SPECIFICATION forming part of Letters Patent No. 662,707, dated November 27, 1900.

Application filed June 6, 1899. Serial No. 719,531. (No model.)

*To all whom it may concern:*

Be it known that I, HENRY BLACKMAN, a citizen of the United States, residing in the borough of Manhattan, city, county, and State of New York, have invented certain new and useful Improvements in Electrical Connectors, of which the following is a specification.

This invention relates to improved means for electrically connecting conducting-bodies. Exposed electrical connections are all liable to deteriorate in use, the deterioration being due in some cases merely to the oxidizing influence of air and moisture and taking place to a greater or less degree, depending upon the metals employed. In many cases, however, electrical connections are necessarily exposed to much more active oxidizing influences. In apparatus for electrolytic decomposition—for example, such as that employed in decomposing sodium chlorid—the connections are exposed to extremely rapid corrosive action from the gases given off during such decomposition.

It is the object of my invention to produce a connection which will be protected from such influences and which will retain indefinitely its conductivity and efficiency.

To this end my invention provides the novel connection and connecting means hereinafter fully described, and pointed out in the claims.

Figure 1:
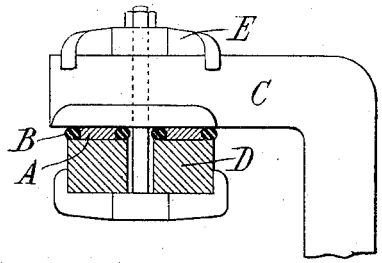
Figure 3:
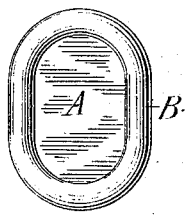
Figure 4:
Figure 2:
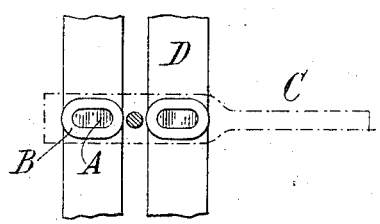
Figure 6:
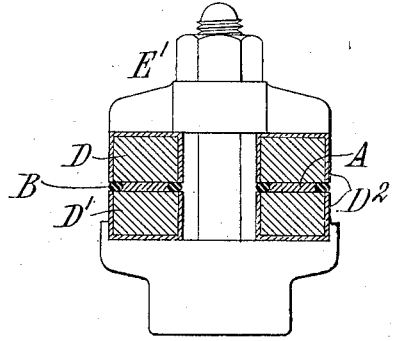
Figure 5:
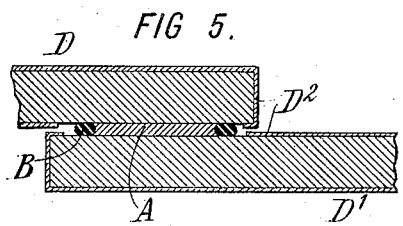
Figure 7:
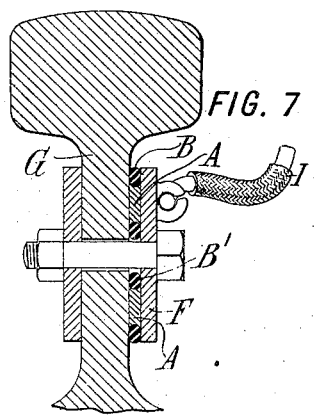
Figure 8:
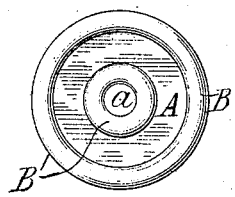
Figure 9:
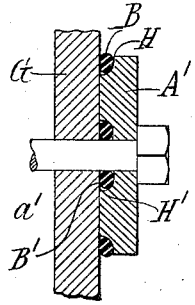

Referring to the accompanying drawings, in which I have illustrated my invention as applied to several different uses, Figure 1 is a sectional elevation of my invention as applied to a connection between the supporting arm or terminal of an electrode and the conductors or bus-bars in an electrolytic decomposing apparatus. Fig. 2 is a plan thereof, the arm being indicated by dotted lines. Fig. 3 is a plan of the form of connecting-plate I prefer to use for this and analogous purposes. Fig. 4 is a section thereof. Fig. 5 is a longitudinal section of my improved device as applied to connections between adjacent bus-bars. Fig. 6 is a cross-section thereof. Fig. 7 is a sectional view illustrating my invention as applied to electric or other railway bonds. Fig. 8 is a plan of the form of connecting-plate I prefer to use for this purpose, and Fig. 9 is a sectional view of a modification.

Referring to the drawings, A is a plate of metal of any suitable shape and thickness. It may be of zinc, copper, or other metal, depending upon the character of its use, copper being preferred for most purposes.

B is a ring, preferably of soft rubber, which extends around the edges of the plate A and which is preferably of greater thickness than said plate. The ring B may be of any suitable material. Its purpose is to prevent the ingress of corrosive gases and liquids to the contacting surfaces, and it should be formed of a material that is capable of so resisting corrosion and oxidation that it may effect this result for a length of time sufficient to render its use practical and economical. Fibrous materials, asbestos, and some of the softer metals may be employed, if desired; but I have found in practice that soft rubber is an exceedingly efficient and economical material for this purpose. The plate A is preferably formed around its edges with a shallow groove to receive the ring B, although this is not an essential feature, but is useful to hold the ring in place during handling and transportation. The plate A, with its ring, is designed to be clamped or otherwise held directly between the two surfaces to be connected. When so clamped, the ring B is compressed tightly against the adjacent surfaces and forms a durable air and liquid tight connection or packing which surrounds the plate at all points, so that the ingress of gas and liquid is prevented. The compression between the two parts to be connected should be sufficient to make firm contact with the plate. In Figs. 1 and 2 I have shown two such plates confined between the terminal C of an electrode and the bus-bars or conductors D, the parts being held together by a suitable clamp E. When used as shown, there are two connecting areas formed by the plates A between the arm or terminal C and bars D, these areas being protected by the rings B against ingress of liquid and gas. The contacting areas thus formed will remain in good electrical connection even though the surrounding parts are badly corroded. For this character of connection I prefer to employ a plate of the shape shown in Figs. 3 and 4, for the reason that, while the shape may be as desired, it is advisable that it should be rounded, because in such case the ring will by its own elasticity cling to the edges of the plate. If such plate were square or rectangular, it would be preferable to glue or otherwise cement the ring to the edges of the plate in order to avoid air-spaces between the two. While a small body of confined air would not be particularly harmful, yet it is desirable to exclude the air as much as possible.

It is sometimes necessary or desirable to connect several vats in electrolytic decomposing apparatus, and this is usually done by running a tie-conductor between the adjacent bus-bars. In Figs. 5 and 6 I have shown my improved plate applied in this connection. The bus-bars D and tie-conductors D', which are preferably provided with a coat of lead $D^2$, are scraped clean at the point of connection, and the plate A is clamped between them, as shown, by means of a clamp E'.

In Fig. 7 I have shown the invention as applied to a bond for connecting the rails of electric or other railways. For use in this connection the plates A may be applied directly between the fish-plates and the rails, thereby utilizing the fish-plate as a conductor. I prefer, however, to connect the rails by conducting-wires and to use my improved device for making the connection between the rails and the wires. In this case a separate metal plate F may be bolted to the rail G, the plate A being arranged between the two and the conducting-wire I being soldered or otherwise connected to the plates F. The common practice at the present time is to solder the two ends of the conducting-wire directly to the adjacent rails. When it is desired to lift or replace a rail, the wires are removed and soldered to the new rail. This necessitates resoldering each time a rail is lifted or inserted and has the further disadvantage that the work must be done when the rails are in position, which is inconvenient and troublesome. By this invention the conducting-wires may be conveniently united to the plates F during the process of manufacture and it is only necessary to bolt the parts to the rail, as shown. The connection may be easily removed by taking out the bolt when it is desired to insert a new rail. The connection between wire and plates being a permanent one resoldering is avoided.

In Fig. 8 I have shown a form of plate suitable for such connections or any similar connection in which it is desired to pass a bolt through the plate. As shown, the plate is circular and is formed with a central hole or opening $a$. In addition to the ring B a second ring B' is used, it being inserted in such opening, as shown, and the entrance of gas or liquid is thus not only prevented around the circumference of the plate, but also around the bolt. The annular contacting area is thus bounded by the inner and outer rings and is substantially unattackable by corrosive influences.

In Fig. 9 I have shown a modification of my invention, which may be substituted for the construction shown in Figs. 7 and 8. By this modification I dispense with the plate F and solder the connecting-wires directly to the plate A', which in this case is formed with a circular groove H. The ring B is placed in this groove and is compressed between the plate and rail, as shown. If the plate A' is to be connected to the rail by a bolt passing through its center, it is formed with a bolt-hole $a'$ and a second groove H' surrounding said hole and adapted to receive a second ring B'. If such plate is to be otherwise clamped to the rail or other surface, the hole $a'$, groove H', and ring B' may be omitted. This construction may be used in other connections, and in this case the contacting surfaces will be formed with a depression for receiving the ring. I prefer, however, to provide a separate connecting-plate, as this construction is ordinarily cheaper and more convenient.

My invention has the important practical advantage that it provides an electric connection affording the same conductivity and the same permanence due to freedom from corrosion as a soldered joint, while it avoids the trouble and expense of soldering and enables the joint to be disconnected at any time with the minimum of trouble and delay.

What I claim is—

1. The improved electrical connection comprising two conducting parts, the adjacent surfaces of which are to be electrically connected, a separable conducting-plate interposed between said surfaces, packing means bounding said contacting surfaces on all sides to exclude corrosive agents therefrom, and means for pressing said conducting parts together to clamp said plate and packing between them.

2. An electrical connector having a contact-surface formed with an aperture, combined with a packing-ring surrounding said contact-surface, and a second packing-ring within the first, said rings adapted when compressed against the surface with which said contact-surface is in contact, to exclude corrosive agents from said surfaces.

3. The improved electrical connection comprising two contacting surfaces, one of which is formed with an aperture, a protecting packing-ring surrounding such surfaces, and a second packing-ring within the first to prevent the entrance of corrosive agents between them.

4. The combination with two bodies having contact-surfaces, one of which is formed with an aperture, a packing-ring surrounding such surfaces, and a second packing-ring within the first, of means for holding such surfaces pressed together for effecting electrical contact between them.

5. A plate for electrically connecting surfaces comprising a conducting-body formed with an aperture, a packing-ring extending circumferentially around said body, and a packing-ring in said aperture.

In witness whereof I have hereunto signed my name in the presence of two subscribing witnesses.

HENRY BLACKMAN.

Witnesses:
THOMAS L. RYAN,
O. F. RAYMOND.